United States Patent
Nishida et al.

(10) Patent No.: US 10,587,161 B2
(45) Date of Patent: Mar. 10, 2020

(54) ROTARY ELECTRIC MACHINE

(71) Applicant: HONDA MOTOR CO., LTD., Tokyo (JP)

(72) Inventors: Atsushi Nishida, Saitama (JP); Manabu Yazaki, Saitama (JP); Nobuaki Hayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 15/787,983

(22) Filed: Oct. 19, 2017

(65) Prior Publication Data
US 2018/0115208 A1 Apr. 26, 2018

(30) Foreign Application Priority Data

Oct. 21, 2016 (JP) .................................. 2016-207232

(51) Int. Cl.
*H02K 1/32* (2006.01)
*H02K 1/27* (2006.01)
(Continued)

(52) U.S. Cl.
CPC ................. *H02K 1/32* (2013.01); *H02K 1/16* (2013.01); *H02K 1/274* (2013.01); *H02K 1/276* (2013.01);
(Continued)

(58) Field of Classification Search
CPC ............... H02K 1/32; H02K 9/12; H02K 9/19
See application file for complete search history.

(56) References Cited

U.S. PATENT DOCUMENTS 2,862,122 A * 11/1958 Courtin .................. H02K 5/132
310/54
3,075,106 A * 1/1963 Chi ......................... F25B 31/02
310/54
(Continued)

FOREIGN PATENT DOCUMENTS

CN 101087079 A 12/2007
JP 2010-239799 A 10/2010
(Continued)

OTHER PUBLICATIONS

Feb. 6, 2018, Japanese Office Action issued for related JP Application No. 2016-207232.
(Continued)

*Primary Examiner* — Dang D Le
(74) *Attorney, Agent, or Firm* — Paratus Law Group, PLLC

(57) ABSTRACT

A rotary electric machine includes a rotor, a stator and a case. The rotor includes a rotor core, a plurality of permanent magnets disposed in the rotor core, and an end face plate disposed such that an inside surface thereof is in contact with an end face of the rotor core. The stator includes a stator core and a coil disposed in the stator core, and is disposed on an outer peripheral side of the rotor to face the rotor. The case accommodates the rotor and the stator, and includes a storage portion for storing liquid therein. A lower part of the rotor is immersed in the storage portion, and a liquid guide groove or a liquid guide hole is provided on an outside surface of the end face plate to extend in a radial direction.

5 Claims, 11 Drawing Sheets

(51) Int. Cl.
  *H02K 1/16* (2006.01)
  *H02K 3/48* (2006.01)
  *H02K 5/04* (2006.01)
  *H02K 9/19* (2006.01)

(52) U.S. Cl.
  CPC ............... *H02K 3/48* (2013.01); *H02K 5/04* (2013.01); *H02K 9/19* (2013.01)

(56) References Cited

U.S. PATENT DOCUMENTS

| | | | | |
|---|---|---|---|---|
| 4,980,588 | A * | 12/1990 | Ogawa | H02K 9/19 123/41.31 |
| 7,642,691 | B2 * | 1/2010 | Morita | H02K 21/044 310/156.72 |
| 7,772,736 | B2 * | 8/2010 | Takahashi | H02K 21/46 310/156.57 |
| 2007/0284961 | A1 | 12/2007 | Takahashi et al. | |
| 2011/0148229 | A1 * | 6/2011 | Esse | H02K 9/19 310/54 |
| 2014/0175917 | A1 * | 6/2014 | Dedrich | H02K 9/19 310/54 |
| 2015/0303774 | A1 | 10/2015 | Kitta et al. | |
| 2018/0115220 | A1 * | 4/2018 | Hayashi | H02K 1/16 |

FOREIGN PATENT DOCUMENTS

| | | |
|---|---|---|
| JP | 2011-120417 A | 6/2011 |
| JP | 5369634 B2 | 12/2013 |
| JP | 2014-072921 A | 4/2014 |
| JP | 5751105 B2 | 7/2015 |
| WO | WO 2014/170938 A1 | 10/2014 |

OTHER PUBLICATIONS

Apr. 1, 2019, Chinese Office Action issued for related CN Application No. 201710839505.0.

* cited by examiner

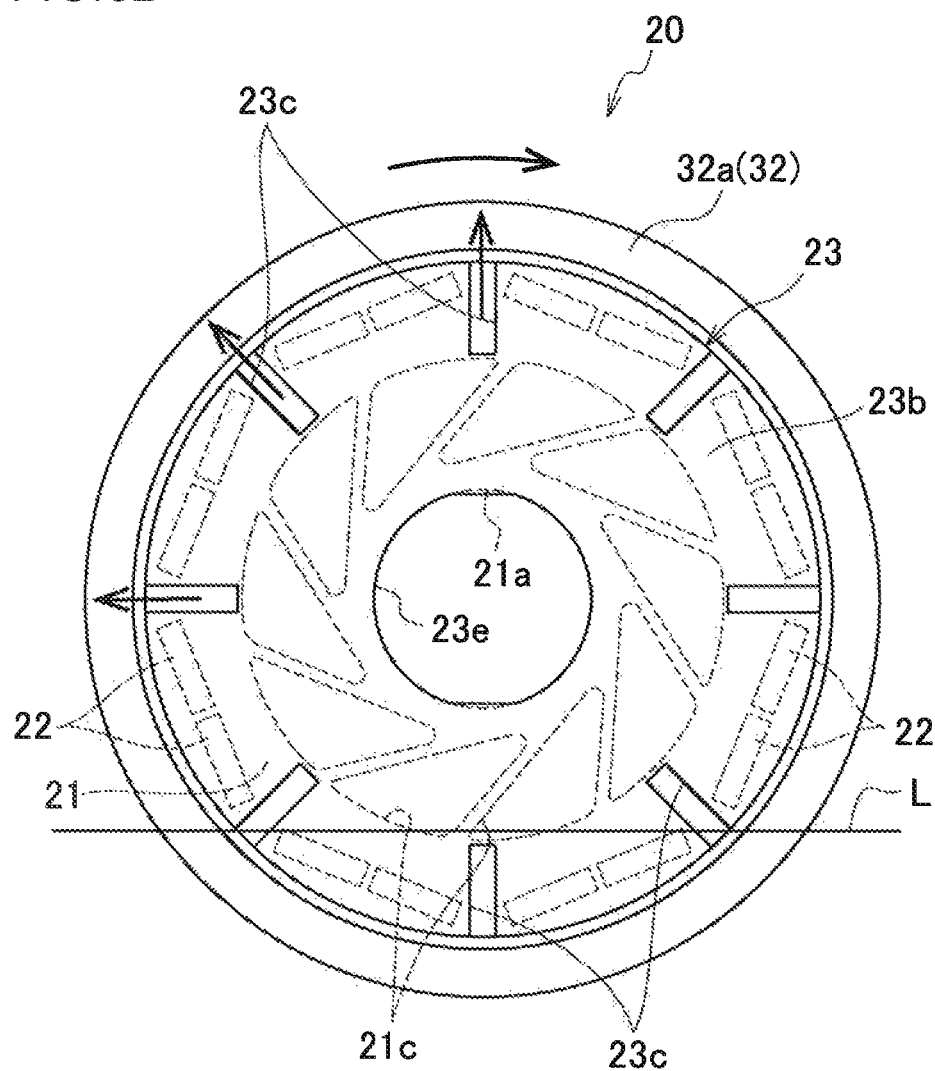

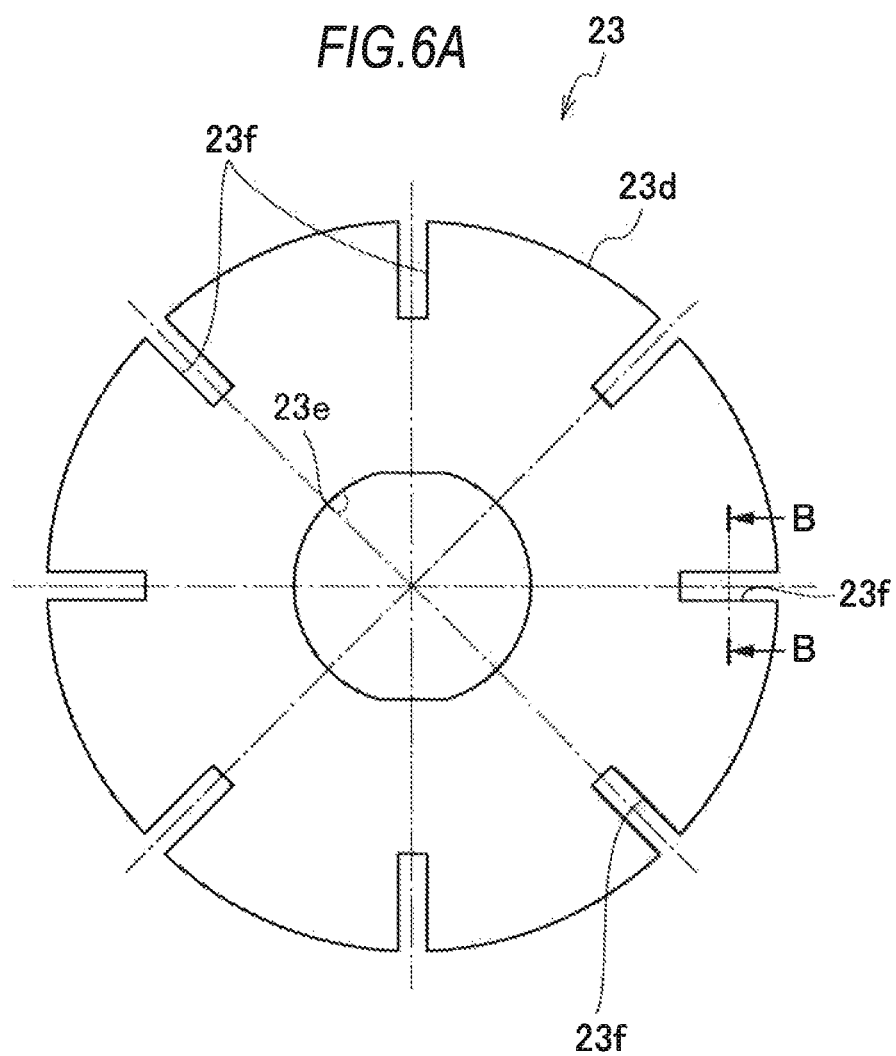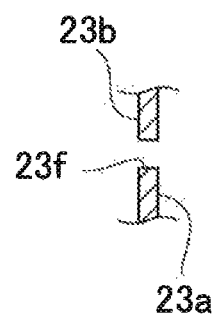

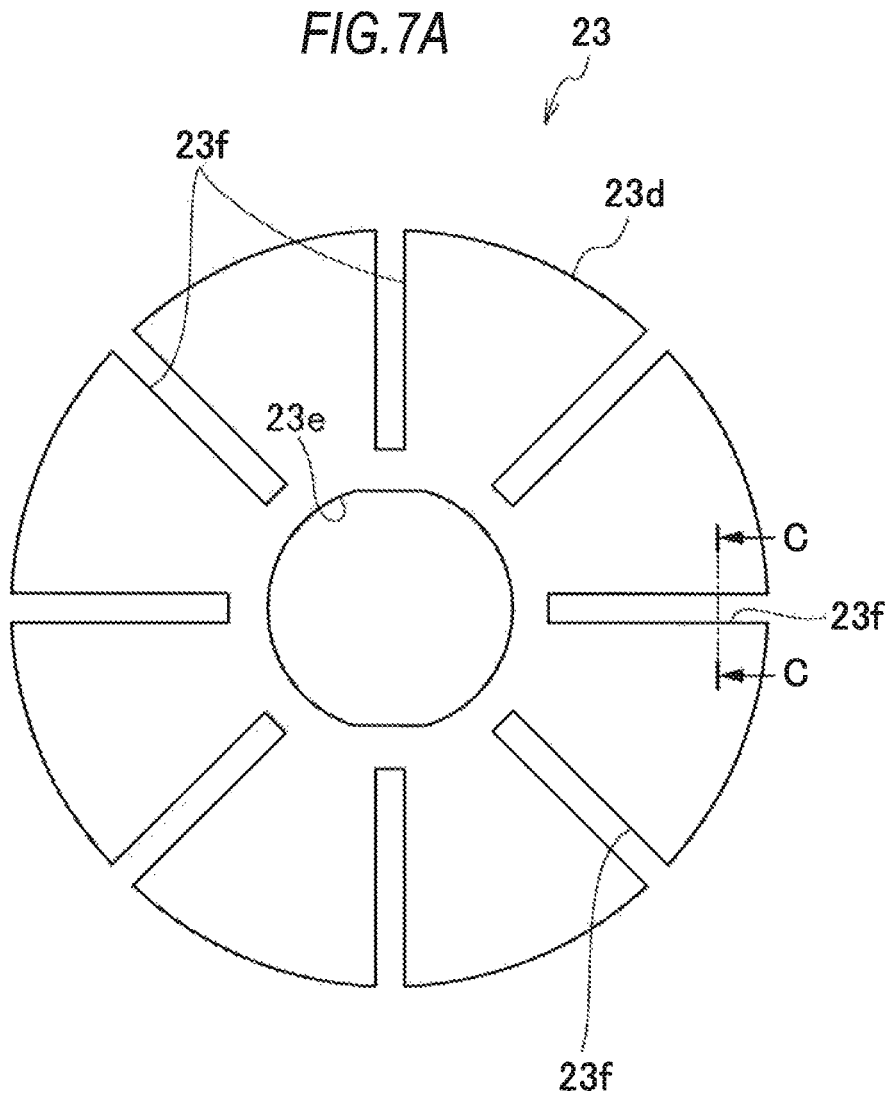
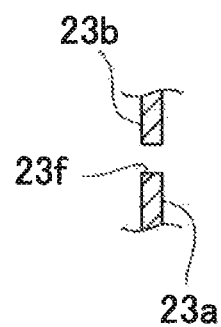
FIG.7A
FIG.7B

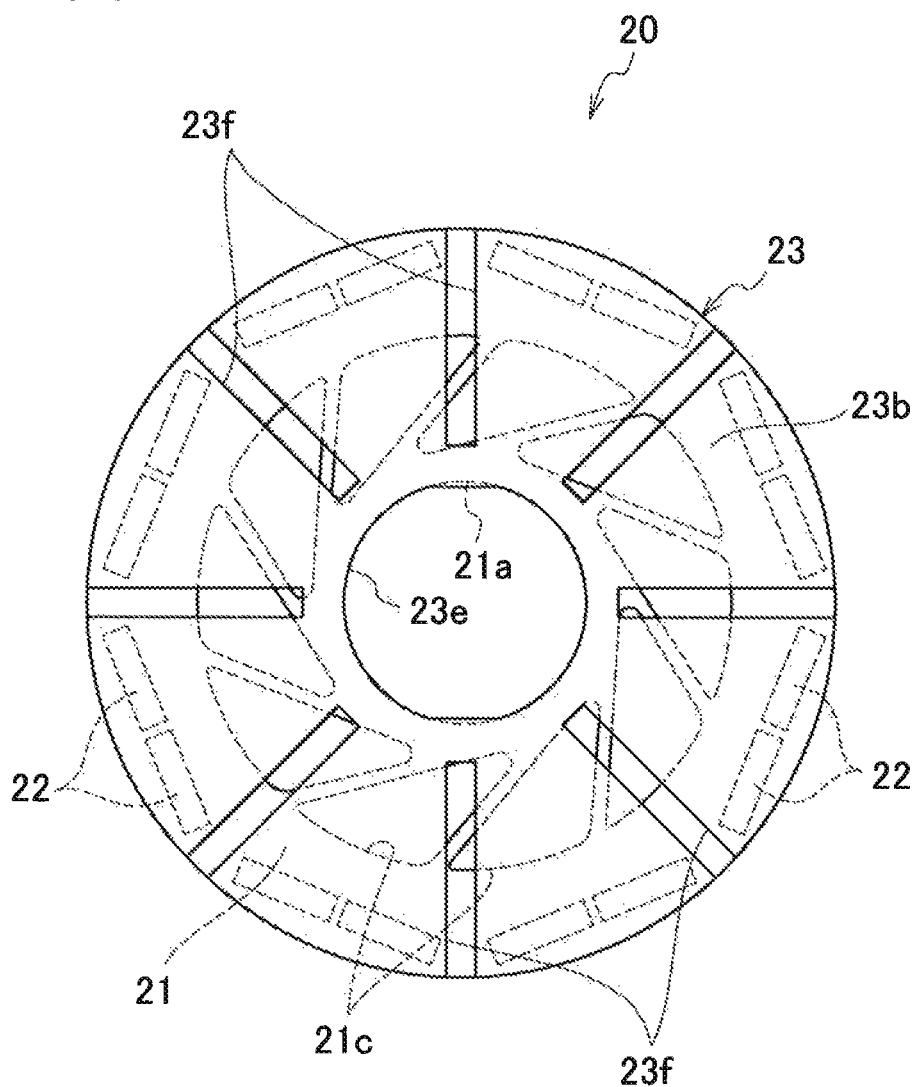

ROTARY ELECTRIC MACHINE

CROSS-REFERENCE TO RELATED APPLICATION

This application claims priority from Japanese Patent Application No. 2016-207232 filed on Oct. 21, 2016, the entire contents of which are incorporated herein by reference.

TECHNICAL FIELD

The present invention relates to a rotary electric machine that is mountable on vehicles.

BACKGROUND ART

In recent years, since there is a problem that a temperature of a permanent magnet and a temperature of a coil rise in a hybrid vehicle or an EV vehicle using a rotary electric machine as a driving source, resulting in greatly affecting performance of the rotary electric machine, a technique for efficiently cooling the permanent magnet and the coil has been proposed.

In a driving system disclosed in patent literature 1, a refrigerant scraped up by a gear, the refrigerant is supplied from the catch tank to a permanent magnet and a coil through a refrigerant passage formed inside an end face plate. Further, when the refrigerant is supplied to the refrigerant passage formed inside the end face plate, the refrigerant is supplied to a supply port of the end face plate from a cutout portion which is formed in a flange portion of a rotor shaft supporting the end face plate.

In a rotary electric machine disclosed in patent literature 2, a refrigerant discharging device is disposed outside an end face plate, a refrigerant passing through a refrigerant flow passage in a rotor shaft by a discharge pressure of an oil pump is supplied to the refrigerant discharging device through a refrigerant discharging hole of the end face plate, and the refrigerant is supplied to a coil from the refrigerant discharging device.

RELATED ART LITERATURE

Patent Literature

Patent Literature 1: JP-B-5369634
Patent Literature 2: JP-B-5751105

SUMMARY OF THE INVENTION

Problem that the Invention is to Solve

In the configuration disclosed in patent literature 1, however, the catch tank is required to scrape up the refrigerant by the gear, the housing shape becomes complicated, and the shape of the rotor shaft becomes complicated.

In the configuration disclosed in patent literature 2, the permanent magnet cannot be sufficiently cooled, the shape of the rotor shaft becomes complicated due to the shaft-center oil supply, and the oil pump and the refrigerant discharging device are separately required.

The invention is to provide a rotary electric machine which can efficiently cool a permanent magnet and a coil with a simple configuration.

Means for Solving the Problem

In order to achieve the above object, according to an invention of aspect 1, there is a rotary electric machine (for example, a rotary electric machine 10 in an embodiment) including:

a rotor (for example, a rotor 20 in an embodiment) which includes a rotor core (for example, a rotor core 21 in an embodiment), a plurality of permanent magnets (for example, permanent magnets 22 in an embodiment) disposed in the rotor core, and at least one end face plate (for example, an end face plate 23 in an embodiment) disposed such that an inside surface (for example, an inside surface 23a in an embodiment) thereof is in contact with an end face of the rotor core;

a stator (for example, a stator 30 in an embodiment) which includes a stator core (for example, a stator core 31 in an embodiment) and a coil (for example, a coil 32 in an embodiment) disposed in the stator core, and is disposed on an outer peripheral side of the rotor to face the rotor; and a case (for example, a case 50 in an embodiment) which accommodates the rotor and the stator, and includes a storage portion (for example, a storage portion 51 in an embodiment) for storing liquid therein, wherein a part of the rotor is immersed in the storage portion, and a liquid guide groove (for example, a liquid guide groove 23c in an embodiment) or a liquid guide hole (for example, liquid guide hole 23f in an embodiment) is provided on an outside surface (for example, an outside surface 23b in an embodiment) of the end face plate to extend in a radial direction.

According to an invention of aspect 2, in the invention of aspect 1, the liquid guide groove or the liquid guide hole radially extends inward from an outer peripheral surface (for example, an outer peripheral surface 23d in an embodiment).

According to an invention of aspect 3, in the invention of aspect 1, the coil includes a coil end portion (for example, a coil end portion 32a in an embodiment) which protrudes from one axial end face of the stator core, and the liquid guide groove or the liquid guide hole and the coil end portion overlap with each other in an axial direction.

According to an invention of aspect 4, in the invention of aspect 1, a plurality of the liquid guide grooves or a plurality of the liquid guide holes are provided at equal intervals circumferential direction.

According to an invention of aspect 5, in the invention of aspect 2, the liquid guide hole is disposed to extend in the radial direction between the permanent magnets adjacent to each other in a circumferential direction.

According to an invention of aspect 6, in the invention of aspect 5, the rotor core includes a permanent magnet accommodating portion (for example, a magnet accommodating hole 21b in an embodiment) which accommodates the permanent magnet, and a lightening portion (for example, a lightening hole 21c in an embodiment) which is provided radially inside of the permanent magnet accommodating portion, and the light guide hole communicates with the lightening portion.

According to an invention of aspect 7, in the invention of aspect 1, the rotor core includes a permanent magnet accommodating portion (for example, a magnet accommodating hole 21*b* in an embodiment) which accommodates the permanent magnet, and a lightening portion (for example, a lightening hole 21*c* in an embodiment) which is provided radially inside of the permanent magnet accommodating portion, and the liquid guide groove includes a through-hole (for example, a through-hole 23*g* in an embodiment) which communicates with the lightening portion.

Advantage of the Invention

According to the invention of aspect 1, since a part of the rotor is immersed in the storage portion, the plurality of permanent magnets disposed in the rotor core are cooled by the liquid stored in the storage portion. In addition, the liquid stored in the storage portion is stored in the liquid guide groove or the liquid guide hole of the end face plate and is scattered by the centrifugal force with the rotation of the rotor, whereby the coil positioned on the outer peripheral side of the rotor is cooled. Thus, both the permanent magnet and the coil can be cooled without using a driving force of an oil pump or the like.

Furthermore, when the rotor rotates at the low speed, the liquid level of the storage portion is high, and thus the permanent magnet can be actively cooled. When the rotor rotates at the high speed, the liquid level of the storage portion lowers and the liquid to be scattered increases, and thus the coil can be actively cooled.

According to the invention of aspect 2, since the liquid guide groove or the liquid guide hole radially extends inward from the outer peripheral surface, the liquid accumulated in the liquid guide groove or the liquid guide hole can be easily scattered toward the coil by the centrifugal force.

According to the invention of aspect 3, since the liquid guide groove or the liquid guide hole and the coil end portion overlap with each other in the axial direction, the liquid scattered from the end face plate can be supplied to the coil end portion.

According to the invention of aspect 4, since the plurality of liquid guide grooves or the plurality of liquid guide holes are provided at equal intervals in the circumferential direction, the liquid can be continuously supplied to the coil during the rotation of the rotor.

According to the invention of aspect 5, since the through-hole is disposed to extend in the radial direction between the permanent magnets adjacent to each other in the circumferential direction, there is no hindrance to the function of the end face plate which prevents the permanent magnet from coming off.

According to the invention of aspect 6, since the liquid guide hole of the end face plate communicates with the lightening portion of the rotor core, the liquid supplied from the liquid guide hole is supplied to the rotor core, so that the permanent magnet can be cooled from the inside of the rotor core.

According to the invention of aspect 7, since the through-hole formed in the liquid guide groove of the end face plate communicates with the lightening portion of the rotor core, the liquid supplied from the through-hole is supplied to the rotor core, so that the permanent magnet can be cooled from the inside of the rotor core.

BRIEF DESCRIPTION OF DRAWINGS

FIG. 5B is a side view of the main portions when the rotary electric machine rotates at a high speed.

FIG. 6A is a side view of an end face plate according to a first modified example, and FIG. 6B is a cross-sectional view taken along line B-B in FIG. 6A.

FIG. 7A is a side view of an end face plate according to a second modified example, and FIG. 7B is a cross-sectional view taken along line C-C in FIG. 7A.

FIG. 8 is a side view of a rotor according to the second modified example.

MODE FOR CARRYING OUT THE INVENTION

Figure 1:
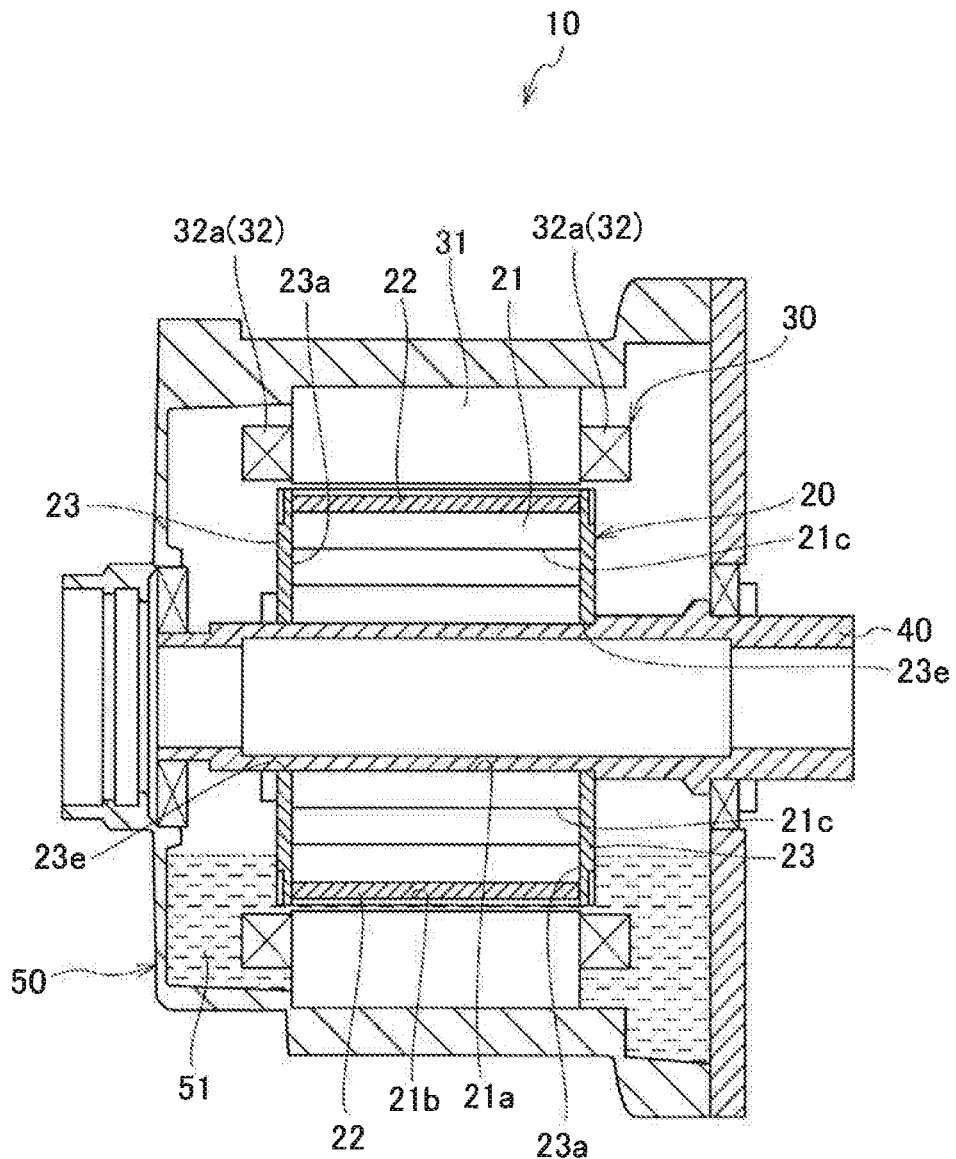
FIG. 1 is a cross-sectional view of a rotary electric machine according to an embodiment of the invention.

A rotary electric machine according to an embodiment of the invention will be described with reference to FIGS. 1 to 4 and FIGS. 5A and 5B. The drawings are seen in a direction in which reference numerals given herein look normally.

[Rotary Electric Machine]

As illustrated in FIG. 1, a rotary electric machine 10 according to the embodiment is a so-called inner-rotor type rotary electric machine including a rotor 20, stators 30 disposed on an outer periphery side of the rotor 20 to face each other with a slight gap therebetween, a rotor shaft 40 attached to an inner periphery of the rotor 20 so as to rotate integrally with the rotor 20, and a case 50 that accommodates the rotor 20 and the stator 30 and rotatably supports the rotor shaft 40.

[Case]

The case 50 has substantially a cylindrical shape, and the stator 30 is fixed to the inner periphery of the case. The case 50 is provided with a storage portion 51, which stores liquid (for example, lubricating oil), at a lower part thereof.

[Stator]

The stator 30 includes a stator core 31 and a coil 32 wound around the stator core 31. The stator core 31 is formed by laminating a plurality of press-punched steel sheets in an axial direction. A plurality of teeth are formed on the inner periphery of the stator core 31, and a plurality of slots partitioned and formed between the adjacent teeth penetrate through the stator core 31 in the axial direction and are disposed at equal intervals in a circumferential direction.

The coil 32 is wound around each of the teeth, and coil end portions 32*a* protrude from both axial end faces of the stator core 31. Since the coil 32 generates heat when the rotary electric machine 10 is driven to rotate, it is necessary to cool the coil 32 in order to avoid performance degradation and deterioration in components due to heat generation.

[Rotor]

Figure 2:
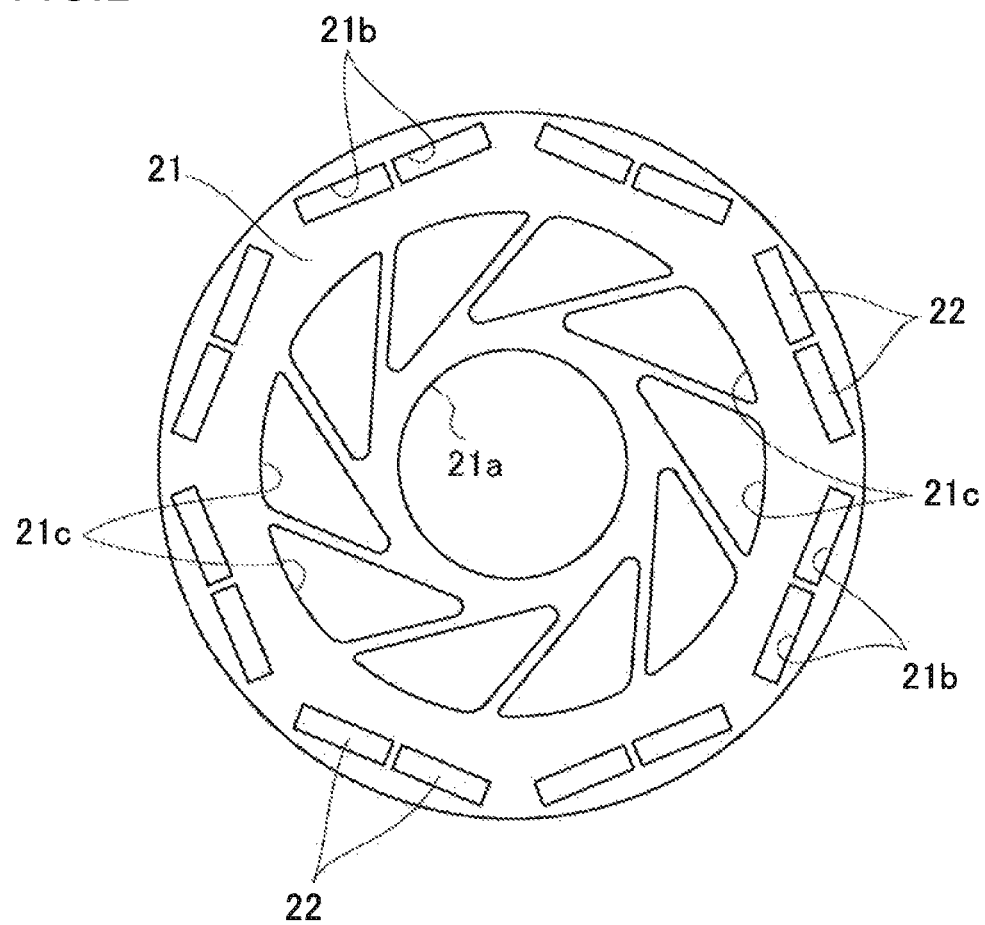
FIG. 2 is a side view of a rotor core.

The rotor 20 includes a rotor core 21, a plurality of permanent magnets 22 disposed in the rotor core 21, and a pair of end face plates 23 fixed to both end faces of the rotor core 21. The rotor core 21 is made up of a plurality of steel sheets laminated in the axial direction. A shaft insertion hole 21*a* is formed at the center of the rotor core 21 to penetrate through the rotor core 21 in the axial direction, and a plurality of magnet accommodating holes 21b are formed at the outer periphery of the rotor core 21 to penetrate through the rotor core 21 in the axial direction. Referring to FIG. 2, eight pairs of magnet accommodating holes 21b are formed, in total, at equal intervals in the circumferential direction, wherein two magnet accommodating holes 21b are defined as one pair. In addition, a plurality of lightening holes 21c are formed at equal intervals in the circumferential direction of the rotor core 21 between the shaft insertion hole 21a and the magnet accommodating hole 21b in a radial direction to penetrate through the rotor core 21 in the axial direction.

The permanent magnet 22 is configured using a rare earth magnet, and is attached to the magnet accommodating hole 21b of the rotor core 21. Since the permanent magnet 22 generates heat when the rotary electric machine 10 is driven to rotate, it is necessary to cool the permanent magnet 22 in order to avoid performance degradation and deterioration in components due to heat generation.

The lower part of the rotor 20 is rotatably supported by the rotor shaft 40 in a state of being immersed in the storage portion 51 provided in the case 50. Therefore, any one of the plurality of permanent magnets 22 attached to the magnet accommodating hole 21b of the rotor core 21 is immersed in the storage portion 51 even when the rotary electric machine 10 is driven to rotate.

[End Face Plate]

The end face plates 23 fixed to both end faces of the rotor core 21 have an annular shape same as the steel sheet constituting the rotor core 21, and an inside surface 23a thereof contacts with the end face of the rotor core 21 to prevent the permanent magnet 22 fixed to the magnet accommodating hole 21b from coming off.

A shaft insertion hole 23e is formed at the center of the end face plate 23 to penetrate through the end face plate 23 in the axial direction.

Figure 3A:
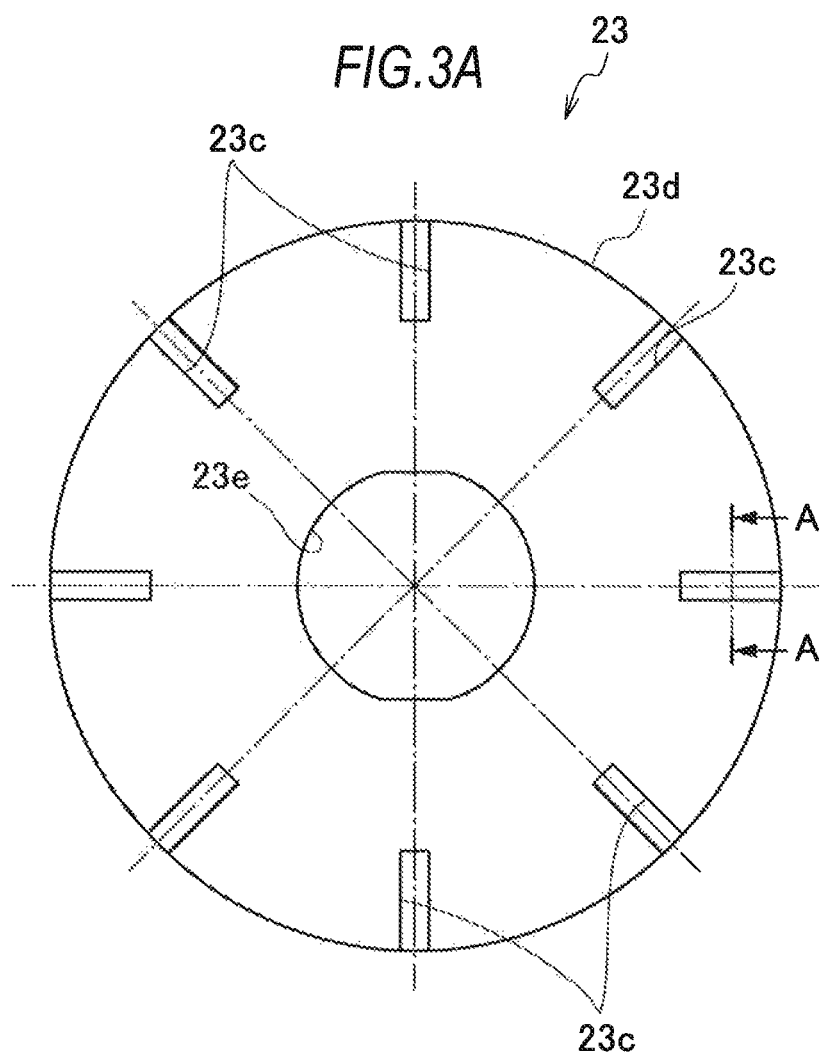
FIG. 3A is a side view of an end face plate.
Figure 3B:
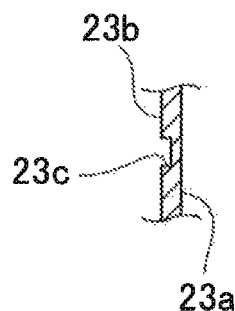
FIG. 3B is a cross-sectional view taken along line A-A in FIG. 3A.
Figure 4:
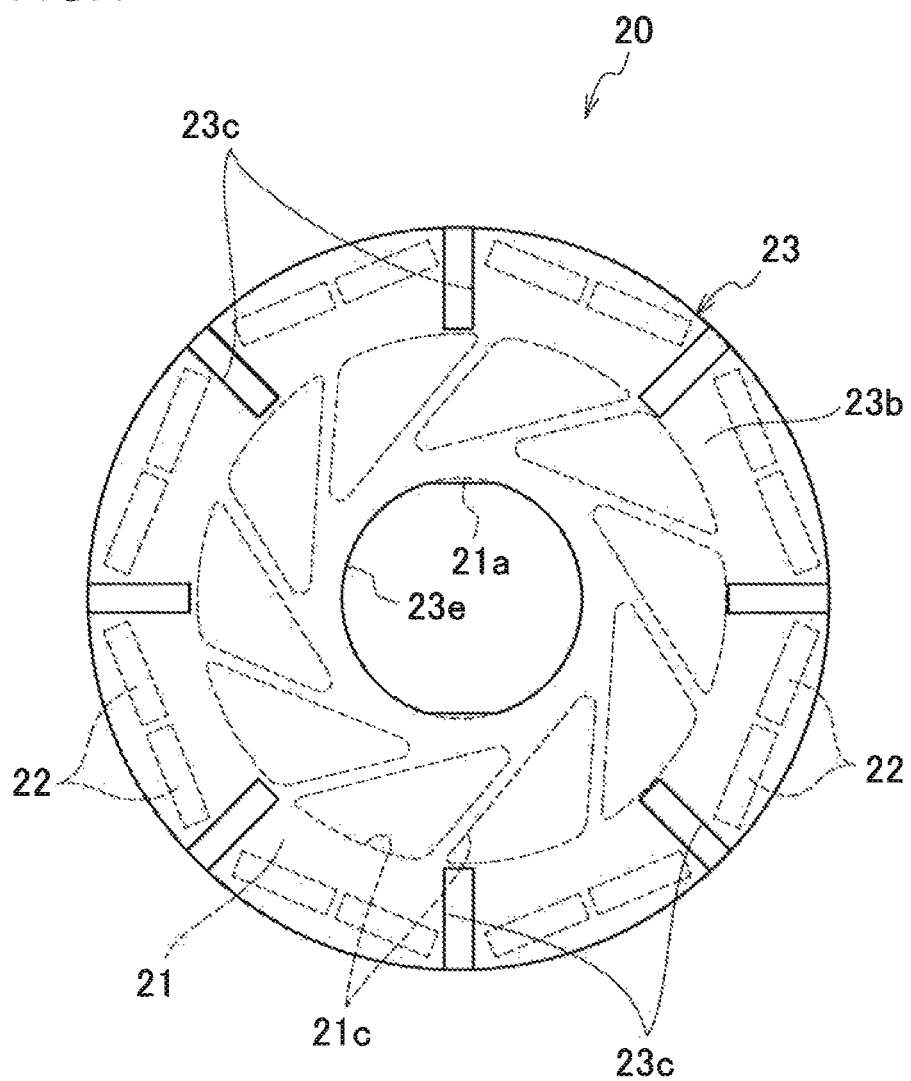
FIG. 4 is a side view of a rotor.

As illustrated in FIGS. 3A, 3B, and 4, a plurality of liquid guide grooves 23c are provided on an outside surface 23b of the end face plate 23 at equal intervals in the circumferential direction so as to extend in the radial direction. The liquid guide groove 23c is a recessed groove that has a rectangular cross section recessed from the outside surface 23b of the end face plate 23, and is disposed to overlap with the coil end portion 32a in the axial direction. That is, the left liquid guide groove 23c of the end face plate 23 in FIG. 1 overlaps in the axial direction with the coil end portion 32a protruding from the left end face of the rotor core 21, and the right liquid guide groove 23c of the end face plate 23 overlaps in the axial direction with the coil end portion 32a protruding from the right end face of the rotor core 21.

In this embodiment, eight liquid guide grooves 23c are formed so as to linearly extend from the outer peripheral surface 23d of the end face plate 23 to the position where the liquid guide grooves do not intersect with the lightening holes 21c disposed in the rotor core 21, and imaginary lines extending along the liquid guide grooves 23c to the inner periphery side are disposed so as to coincide with the axial center of the rotor core 21.

[Operation]

Figure 5A:
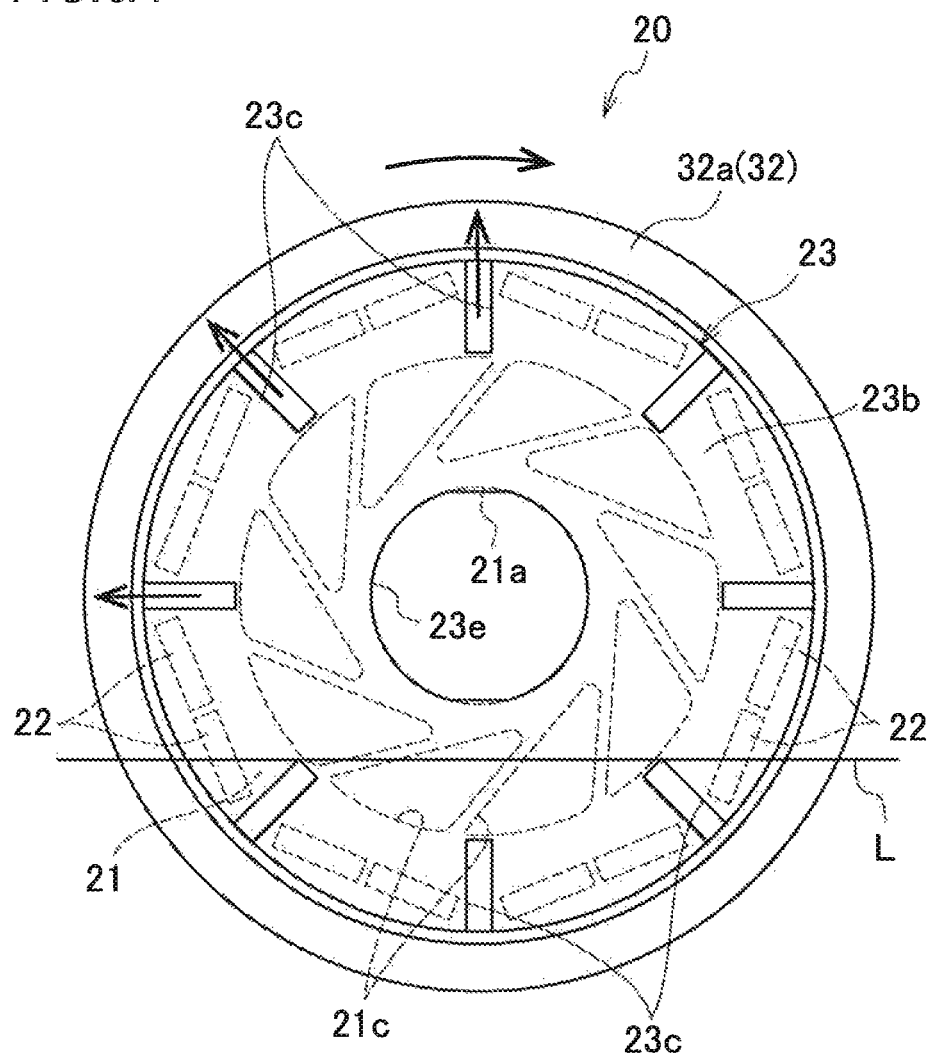
FIG. 5A is a side view illustrating main portions when the rotary electric machine rotates at a low speed.
Figure 9A:
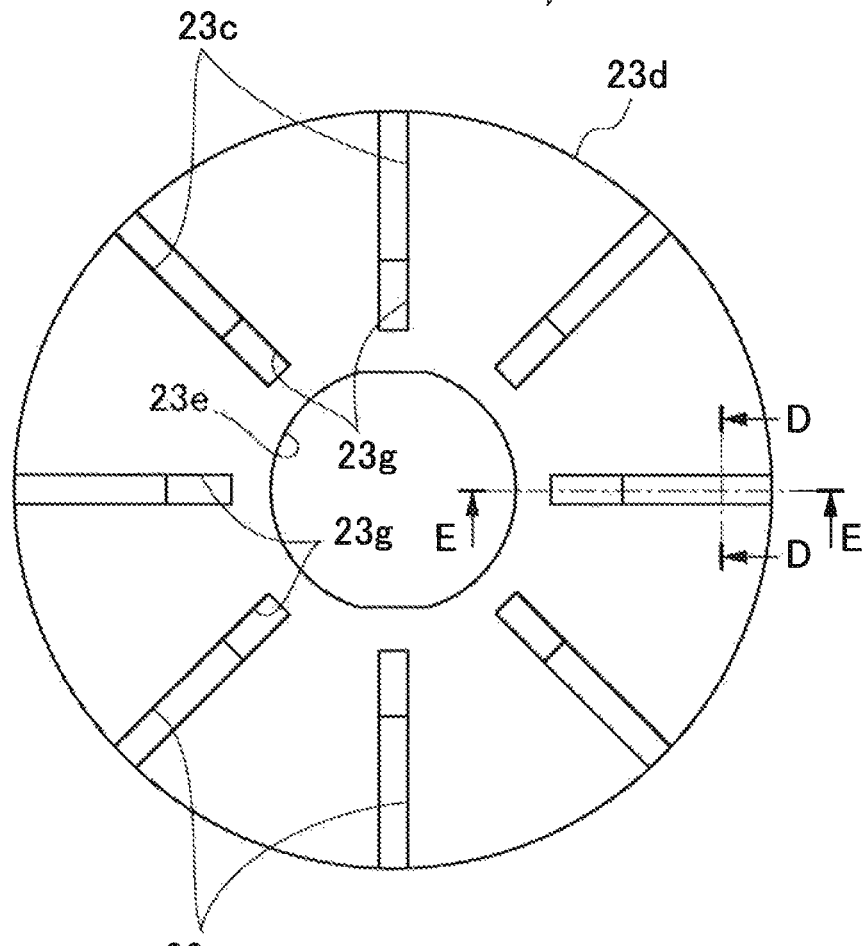
FIG. 9A is a side view of an end face plate according to a third modified example.
Figure 9B:
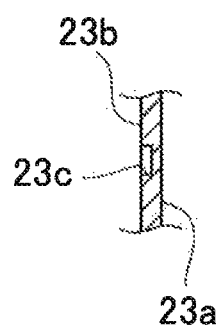
FIG. 9B is a cross-sectional view taken along line D-D in FIG. 9A.
Figure 9C:
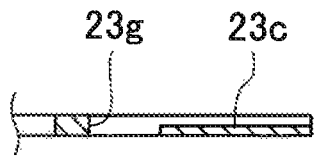
FIG. 9C is a cross-sectional view taken along line E-E in FIG. 9A.
Figure 10:
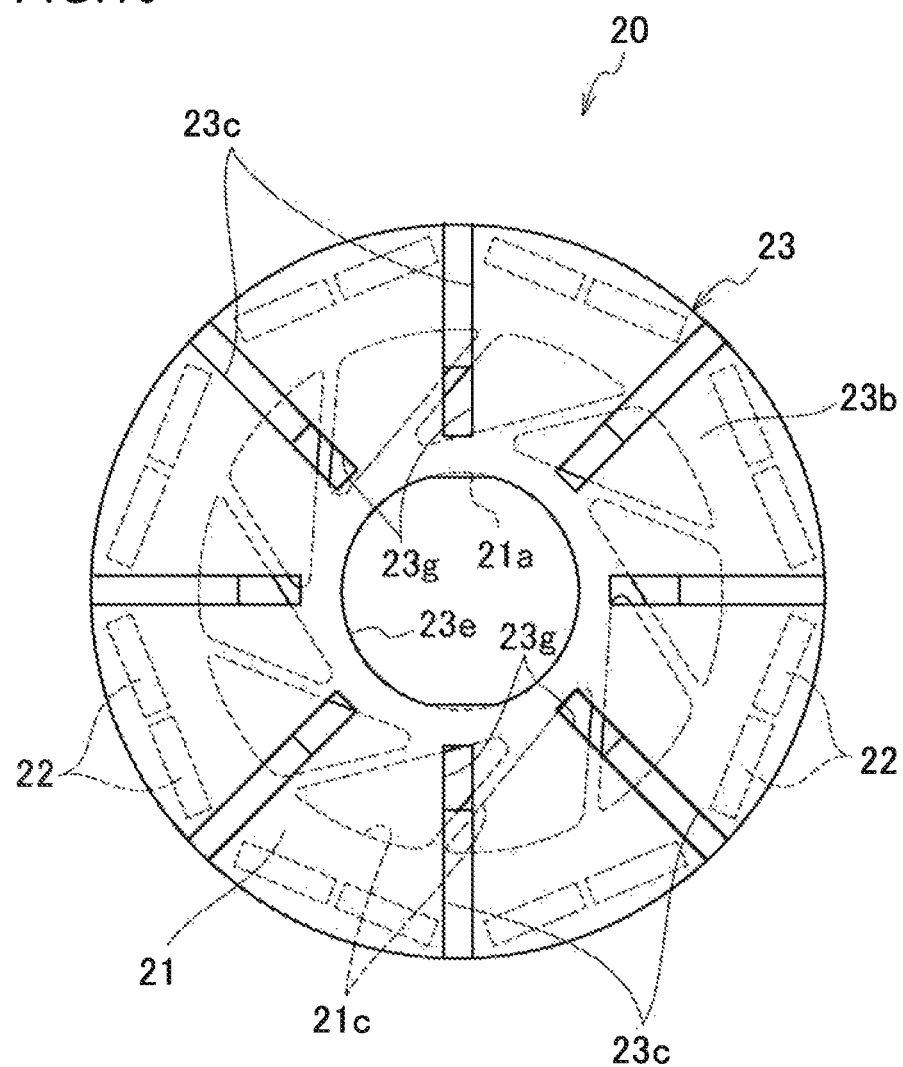
FIG. 10 is a side view of a rotor according to the third modified example.

A cooling operation of the rotary electric machine 10 having the above-described configuration will be described below with reference to FIGS. 5A and 5B. FIG. 5A is a schematic diagram illustrating a state when the rotor 20 rotates at a low speed, and FIG. 5B is a schematic diagram illustrating a state when the rotor 20 rotates at a high speed. In FIGS. 5A and 5B, reference numeral L denotes a liquid level of the storage portion 51.

Since the lower part of the rotor A is immersed in the storage portion 51 provided in the case 50 when the rotor 20 rotates at the low speed, the permanent magnet 22 is cooled via the outer peripheral surface of the rotor core 21 and the end face plate 23 during the rotation of the rotor 20. In addition, since the lower part of the stator 30 positioned on the lower outer peripheral side of the rotor 20 is always immersed in the storage portion 51, the coil 32 immersed in the liquid is also constantly cooled.

On the other hand, the coil 32 positioned above the liquid level of the storage portion 51 is exposed from the storage portion 51 and thus tends to become hot, but the end face plate 23 also rotates due to the rotation of the rotor 20. Thus, the liquid accumulated in the liquid guide groove 23c is scattered by a centrifugal force due to the rotation of the rotor 20, and the stator 30 positioned on the outer peripheral side of the rotor 20 is also cooled by the scattered liquid. Therefore, the coil 32 positioned above the liquid level of the storage portion 51 is also cooled by the scattered liquid.

Similarly, the lower part of the rotor 20 and the lower part of the stator 30 are also immersed in the storage portion 51 provided in the case 50 when the rotor 20 rotates at the high speed, the permanent magnet 22 is cooled via the outer peripheral surface of the rotor core 21 and the end face plate 23 during the rotation of the rotor 20 and the coil 32 immersed in the liquid is also constantly cooled. Further, since the end face plate 23 also rotates with the rotation of the rotor 20, the liquid accumulated in the liquid guide groove 23c is scattered by the centrifugal force due to the rotation of the rotor 20, and thus the coil 32 positioned above the liquid level of the storage portion 51 is also cooled by the scattered liquid.

Since the liquid guide groove 23c is disposed to overlap with the coil end portion 32a in the axial direction, the scattered liquid is mainly supplied to the coil end portion 32a of the coil 32. Accordingly, the coil 32 is cooled from both axial sides, and thus can be efficiently cooled.

Since the amount of liquid to be scattered increases during the high-speed rotation of the rotor 20 compared with the low-speed rotation thereof, the amount of liquid to be supplied to the coil 32 positioned above the liquid level L of the storage portion 51 increases, and the coil 32 can be actively cooled. On the other hand, since the liquid level of the storage portion 51 decreases with the increase in the amount of liquid to be scattered during the high-speed rotation, the permanent magnet 22 can be actively cooled through the rotor core 21 during the low-speed rotation. That is, according to this embodiment, the amount of liquid to be scattered is adjusted depending on the number of rotations of the rotor 20. The amount of liquid to be scattered can also be adjusted depending on the number and shape of liquid guide grooves 23c and the depth of the grooves.

As described above, according to this embodiment, since the lower part of the rotor 20 is immersed in the storage portion 51, the permanent magnet 22 disposed in the rotor core 21 is cooled by the liquid stored in the storage portion 51. In addition, the liquid stored in the storage portion 51 is stored in the liquid guide groove 23c of the end face plate 23 and is scattered by the centrifugal force with the rotation of the rotor 20, whereby the coil 32 positioned on the outer peripheral side of the rotor 20 is cooled. Thus, both the permanent magnet 22 and the coil 32 can be cooled without using a driving force of an oil pump or the like.

Furthermore, when the rotor 20 rotates at the low speed, the liquid level of the storage portion 51 is high, and thus the permanent magnet 22 can be actively cooled. When the rotor 20 rotates at the high speed, the liquid level of the storage portion 51 lowers and the liquid to be scattered increases, and thus the coil 32 can be actively cooled.

Further, since the liquid guide groove 23c radially extends inward from the outer peripheral surface 23d, the liquid accumulated in the liquid guide groove 23c can be easily scattered toward the coil 32 by the centrifugal force.

Further, since the liquid guide groove 23c and the coil end portion 32a overlap with each other in the axial direction, the liquid scattered from the end face plate 23 can be supplied to the coil end portion 32a.

Since the plurality of liquid guide grooves 23c are provided at equal intervals in the circumferential direction, the liquid can be continuously supplied to the coil during the rotation of the rotor 20.

Subsequently, modified examples of the rotary electric machine 10 according to this embodiment will be described.

First Modified Example

In a rotary electric machine 10 according to a first modified example, as illustrated in FIGS. 6A and 6B, liquid guide holes 23f penetrating through the inside surface 23a and the outside surface 23b are provided in the end face plate 23 according to the embodiment, instead of the liquid guide grooves 23c.

The liquid guide holes 23f are formed so as to linearly extend from the outer peripheral surface 23d of the end face plate 23 to the position where the liquid guide holes do not intersect with the lightening holes 21c disposed in the rotor core 21, and imaginary lines extending along the liquid guide holes 23f to the inner periphery side are disposed so as to coincide with the axial center of the rotor core 21.

The end face plate 23 is fixed to the end face of the rotor core 21, and thus a recessed groove is formed by the outside surface 21d of the rotor core 21 and the liquid guide hole 23f of the end face plate 23. Even in the rotary electric machine 10 according to this modified example, the liquid stored in the storage portion 51, by the rotation of the rotor 20, is stored in the liquid guide hole 23f of the end face plate 23 and is scattered by the centrifugal force, and thus the coil 32 positioned on the outer peripheral side of the rotor 20 is cooled.

Further, the liquid guide hole 23f is formed in the end face plate 23, and thus the liquid in the storage portion 51 directly contacts with the end face of the rotor core 21 through the liquid guide hole 23f of the end face plate 23, so that the cooling efficiency of the permanent magnet 22 can be enhanced.

Preferably, the liquid guide hole 23f is disposed so as to extend in the radial direction between the permanent magnets 22 adjacent to each other in the circumferential direction. Thus, there is no hindrance to the original function of the end face plate 23 which prevents the permanent magnet 22 from coming off.

Second Modified Example

In a rotary electric machine 10 according to a second modified example, as illustrated in FIGS. 7A, 7B, and 8, the liquid guide hole 23f according to the first modified example is formed to linearly extend from the outer peripheral surface 23d of the end face plate 23 to the vicinity of the shaft insertion hole 23e across the lightening hole 21c disposed in the rotor core 21.

The liquid guide hole 23f is disposed across the lightening hole 21c of the rotor core 21, thereby communicating with the lightening hole 21c of the rotor core 21. In the rotary electric machine 10 according to the second modified example, therefore, the liquid in the storage portion 51 enters into the inside (lightening hole 21c) of the rotor core 21 through the liquid guide hole 23f of the end face plate 23 in a state where the lower part of the rotor 20 is immersed in the storage portion 51 provided in the case 50, and the permanent magnet 22 can also be cooled from the inside of the rotor core 21 in addition to the cooling operation of the coil 32 by the liquid guide hole 23f.

Third Modified Example

In a rotary electric machine 10 according to a third modified example, as illustrated in FIGS. 9A to 9C, and 10, the liquid guide groove 23c formed in the end face plate 23 according to the embodiment is formed to linearly extend to the vicinity of the shaft insertion hole 23e across the lightening hole 21c disposed in the rotor core 21 and a through-hole 23g is formed at an overlapping position with the lightening hole 21c.

The through-hole 23g is disposed at the overlapping position with the lightening hole 21c of the rotor core 21, thereby communicating with the lightening hole 21c of the rotor core 21. In the rotary electric machine 10 according to the third modified example, therefore, the liquid in the storage portion 51 enters into the inside (lightening hole 21c) of the rotor core 21 through the through-hole 23g of the end face plate 23 in a state where the lower part of the rotor 20 is immersed in the storage portion 51 provided in the case 50, and the permanent magnet 22 can also be cooled from the inside of the rotor core 21 in addition to the cooling operation of the coil 32 by the liquid guide groove 23c.

The invention is not limited to the above-described embodiment and may be appropriately changed or improved.

For example, the rotary electric machine according to the invention may be not only an electric motor but also a generator or a motor generator functioning as an electric motor and a generator.

In addition, the liquid guide groove 23c and the liquid guide hole 23f can be appropriately set in regard to the number, shape, and disposing area.

DESCRIPTION OF REFERENCE NUMERALS AND CHARACTERS 10 rotary electric machine
20 rotor
21 rotor core
21b magnet accommodating hole
21c lightening hole
22 permanent magnet
23 end face plate
23a inside surface
23b outside surface
23c liquid guide groove
23d outer peripheral surface
23f liquid guide hole
23g through-hole
30 stator
31 stator core
32 coil
32a coil end portion
50 case
51 storage portion.

The invention claimed is:

1. A rotary electric machine, comprising:
a rotor which includes a rotor core, a plurality of permanent magnets disposed in the rotor core, and at least one end face plate disposed such that an inside surface thereof is in contact with an end face of the rotor core;
a stator which includes a stator core and a coil disposed in the stator core, and is disposed on an outer peripheral side of the rotor to face the rotor; and
a case which accommodates the rotor and the stator, and includes a storage portion for storing liquid therein, wherein
a part of the rotor is immersed in the storage portion,
a liquid guide groove or a liquid guide hole is provided on an outside surface of the end face plate to extend in a radial direction,
the liquid guide groove or the liquid guide hole radially extends inward from an outer peripheral surface, and
the liquid guide groove or the liquid guide hole is disposed to extend in the radial direction between the permanent magnets adjacent to each other in a circumferential direction.

2. The rotary electric machine according to claim 1,
wherein the coil includes a coil end portion which protrudes from one axial end face of the stator core, and the liquid guide groove or the liquid guide hole and the coil end portion overlap with each other in an axial direction.

3. The rotary electric machine according to claim 1,
wherein a plurality of the liquid guide grooves or a plurality of the liquid guide holes are provided at equal intervals in a circumferential direction.

4. The rotary electric machine according to claim 1,
wherein the rotor core includes a permanent magnet accommodating portion which accommodates the permanent magnet, and a lightening portion which is provided radially inside of the permanent magnet accommodating portion, and
the liquid guide hole communicates with the lightening portion.

5. The rotary electric machine according to claim 1,
wherein the rotor core includes a permanent magnet accommodating portion which accommodates the permanent magnet, and a lightening portion which is provided radially of the permanent magnet accommodating portion, and
the liquid guide groove includes a through-hole which communicates with the lightening portion.

\* \* \* \* \*